Figure 1:
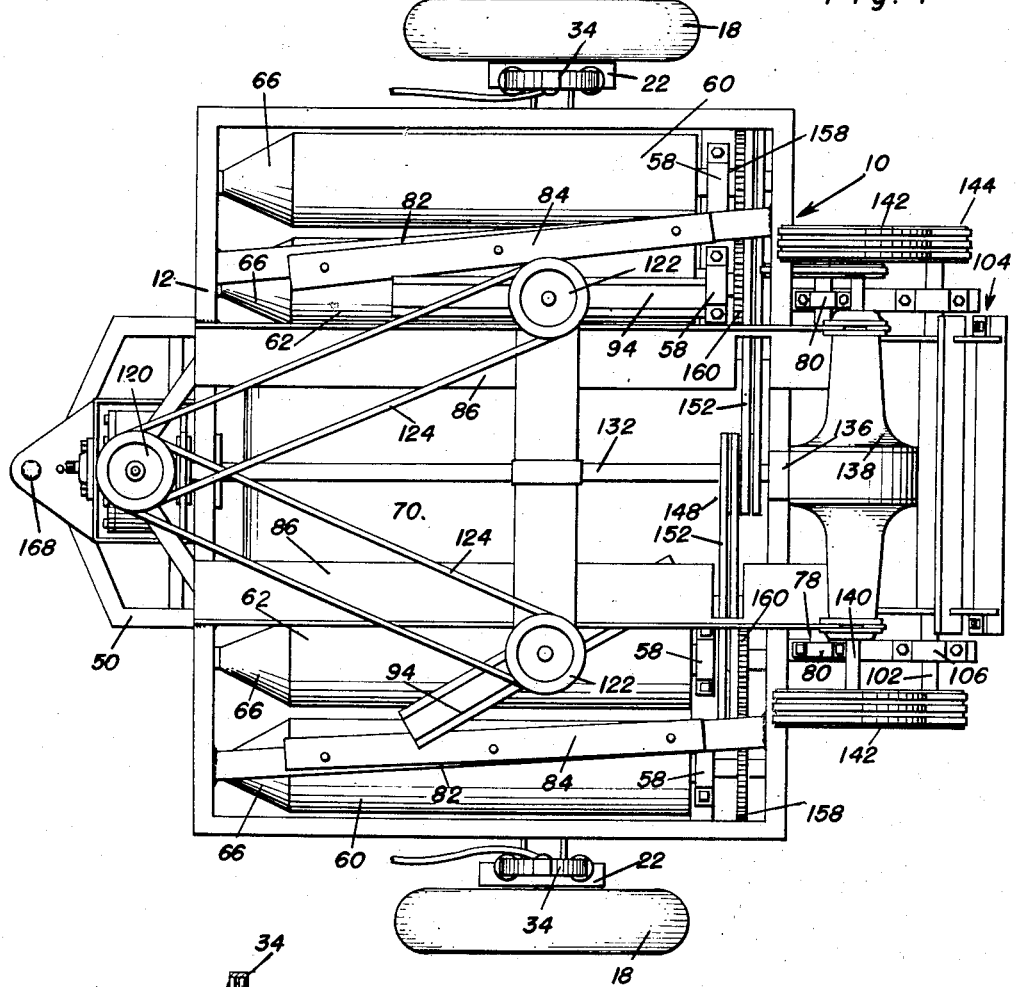

March 29, 1955 J. H. BARNES 2,704,919
STALK AND ROOT LIFTING AND SHREDDING DEVICE
Filed Sept. 29, 1952 5 Sheets-Sheet 1

Johney H. Barnes
*INVENTOR.*

BY *Clarence A. O'Brien
and Harvey B. Jacobson*
Attorneys

March 29, 1955   J. H. BARNES   2,704,919
STALK AND ROOT LIFTING AND SHREDDING DEVICE
Filed Sept. 29, 1952   5 Sheets-Sheet 2

Johney H. Barnes
INVENTOR.

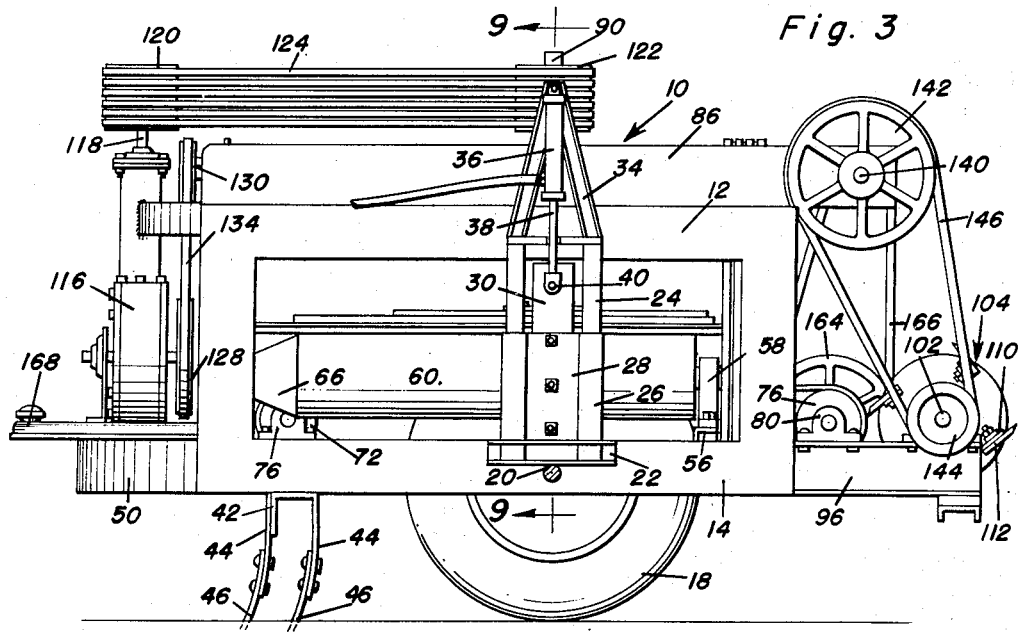

March 29, 1955   J. H. BARNES   2,704,919
STALK AND ROOT LIFTING AND SHREDDING DEVICE
Filed Sept. 29, 1952   5 Sheets-Sheet 4

Johney H. Barnes, INVENTOR.

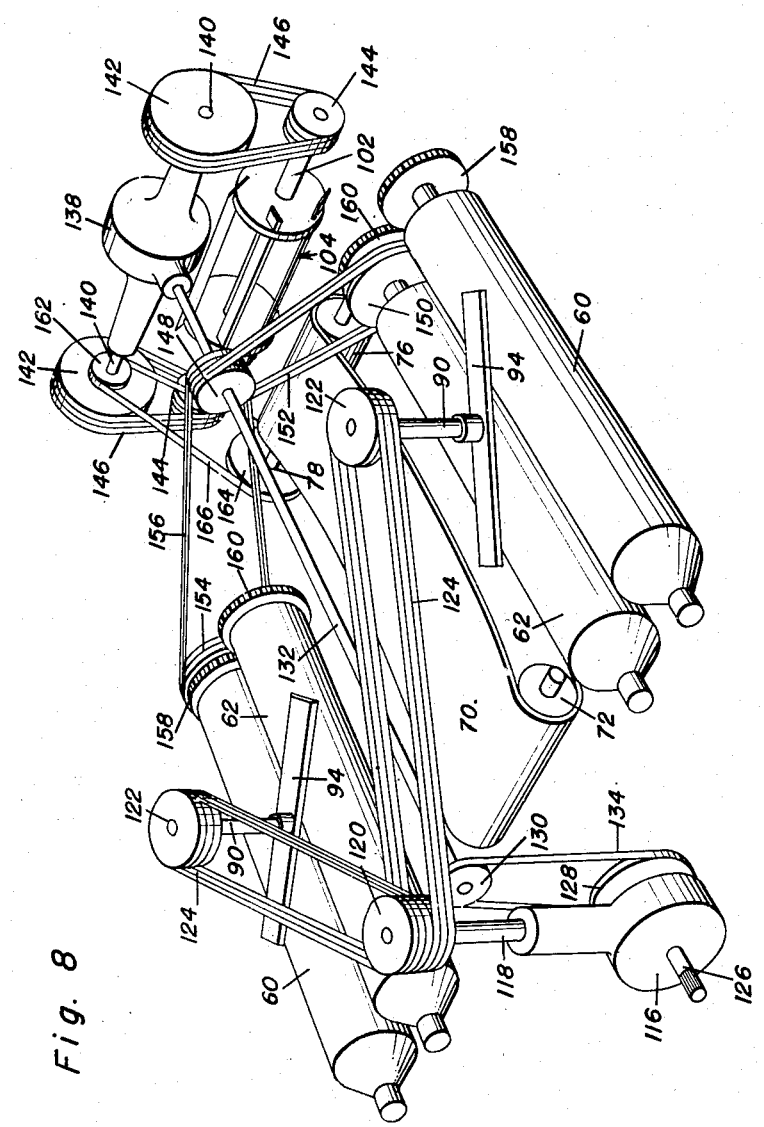

United States Patent Office 2,704,919
Patented Mar. 29, 1955

2,704,919

STALK AND ROOT LIFTING AND SHREDDING DEVICE

Johney H. Barnes, Bakersfield, Calif., assignor to Aldo Ruozi, Bakersfield, Calif.

Application September 29, 1952, Serial No. 312,114

3 Claims. (Cl. 55—66)

This invention relates to new and useful improvements in stalk cutting and shredding apparatus and the primary object of the present invention is to provide a wheeled frame attachable to a tractor and having means thereon for effectively cutting, shredding and scattering roots and stalks.

Another important object of the present invention is to provide a root and stalk shredder including a wheeled frame having pairs of coacting lifting rollers thereon with plows supported on the frame in front of the rollers for loosening the roots of the stalks so that they may be effectively lifted by the rollers.

Yet another object of the present invention is to provide a root and stalk shredder wherein the supporting wheels of the frame are adjustably connected to the frame to permit raising and lowering of the frame with respect to the ground and depth adjustment of the plows supported on the frame in front of the lifting rollers.

Another object of the present invention is to provide a root and stalk shredder involving stationary cutter bars mounted over the lifting rollers and power driven horizontally rotating blades coacting with the cutter bars in cutting the roots and stalks as they are lifted between the coacting lifting rollers.

Another object of the present invention is to provide a root and stalk shredding attachment for tractors involving a power driven conveyor that is located between two sets of lifting rollers so that as the stalks and roots are cut they will be directed onto the conveyor and moved rearwardly to an additional cutting zone.

A further object of the present invention is to provide an apparatus of the aforementioned character involving a power driven transverse cutter reel mounted at the rear of the frame and behind the conveyor so that cut roots and stalks directed rearwardly by the conveyor will be additionally cut and shredded by the cutter reel and then scattered evenly over the field.

A still further aim of the present invention is to provide a root and stalk shredder apparatus wherein the power driven parts are operatively connected together through a novel and improved drive means that includes a power driven shaft for coupling attachment to the power take-off shaft of a tractor, and which apparatus is extremely simple and practical in construction, efficient and durable in operation, inexpensive to manufacture, maintain and service, and otherwise well adapted for the purposes for which the same is intended.

Figure 9:
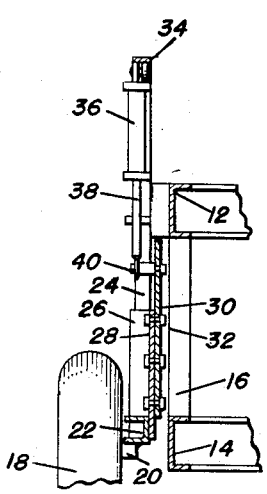
Figure 2:
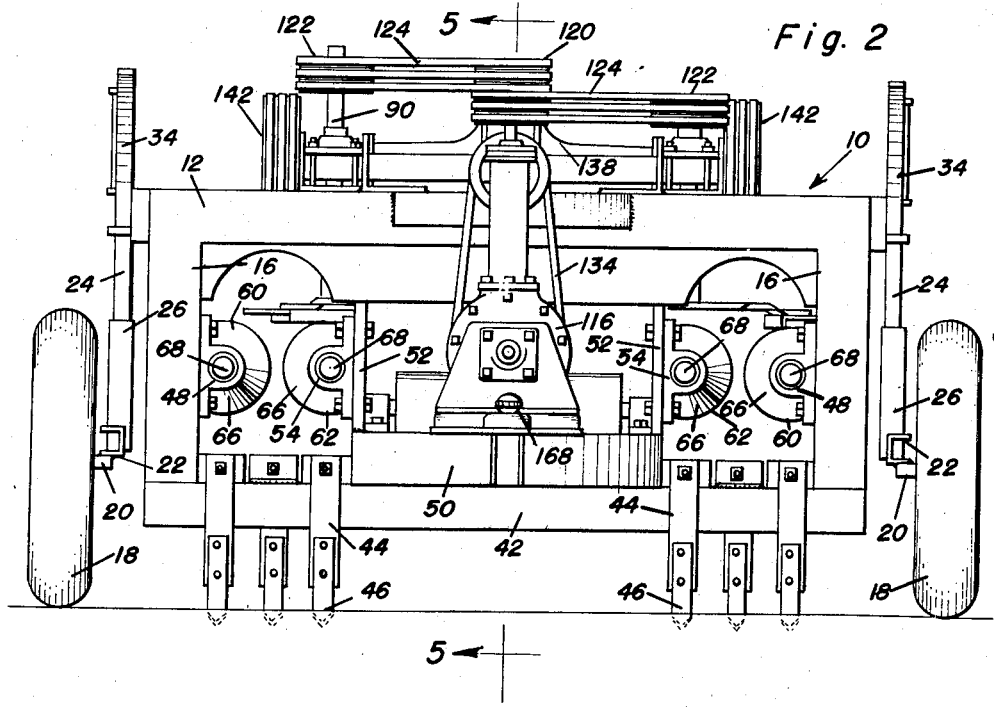
Figure 7:
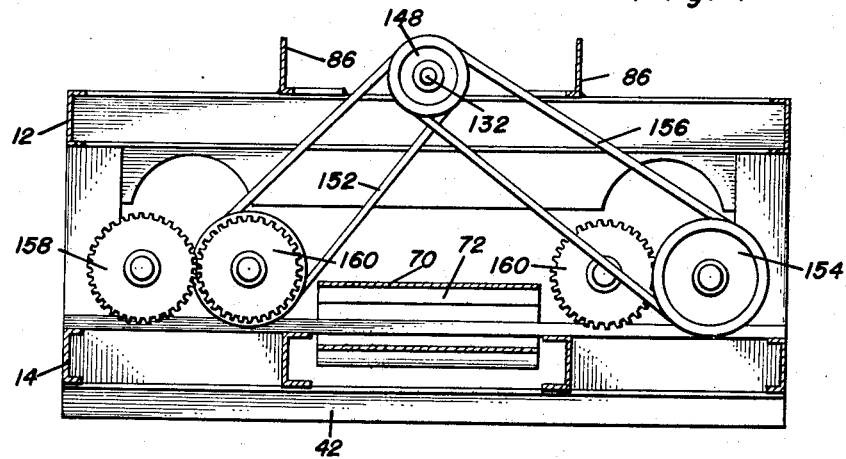
Figure 5:
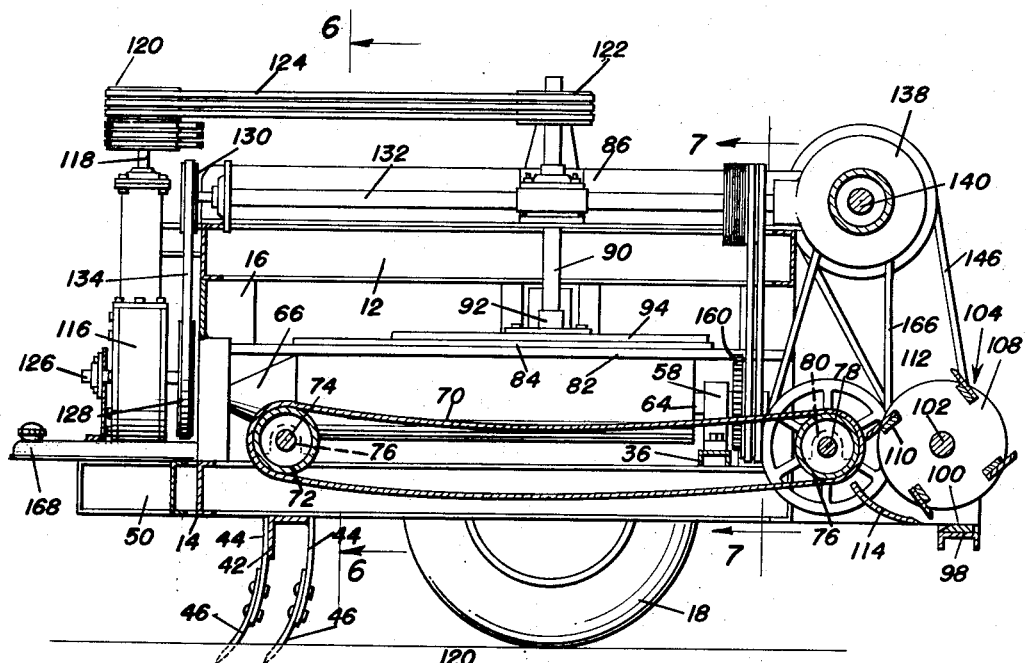
Figure 6:
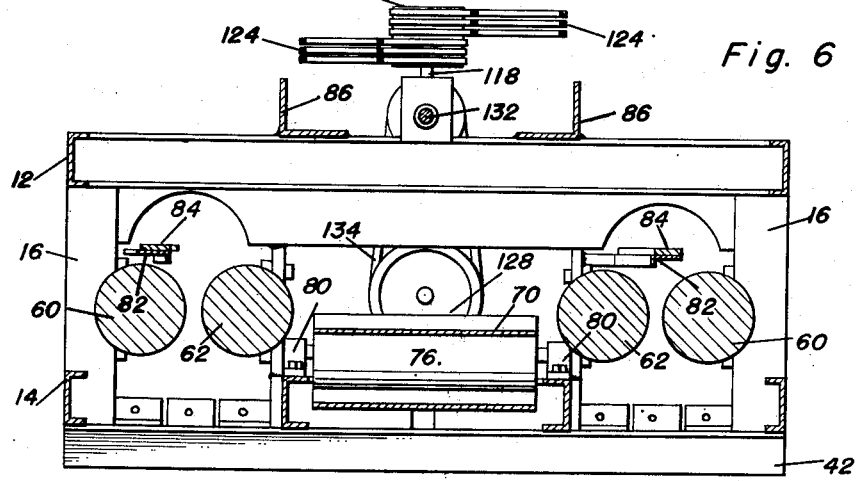

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the present invention;
Figure 2 is a front elevational view of Figure 1;
Figure 3 is a side elevational view of Figure 1;
Figure 4 is a rear elevational view of Figure 3;
Figure 5 is a longitudinal vertical sectional view taken substantially on the plane of section line 5—5 of Figure 2;
Figure 6 is a transverse vertical sectional view taken substantially on the plane of section line 6—6 of Figure 5;
Figure 7 is a transverse vertical sectional view taken substantially on the plane of section line 7—7 of Figure 5;
Figure 8 is a diagrammatic view with parts removed, in perspective, showing the manner in which the various power driven parts of the invention are operatively connected together; and,
Figure 9 is a detail vertical sectional view taken substantially on the plane of section line 9—9 of Figure 3.

Referring now to the drawings in detail, wherein for the purpose of illustration, there is disclosed a preferred embodiment of the present invention, the numeral 10 represents a rigid elongated frame generally, including upper and lower open substantially rectangular frame members 12 and 14 that are rigidly connected together at their corners by posts 16. The posts 16 also retain the frame members spaced apart since their ends are preferably fixed by welding to the corners of the frame members.

Frame 10 is supported by two side wheels 18 which are vertically slidably adjustably secured to the sides of the frame 10. The wheels 18 are disposed on stub axles 20 that are fixed to horizontal channels 22. A pair of vertical rods 24 are fixed at their lower ends to the channels 22 and telescope within the lower ends of vertical tubes 26. The tubes 26 are connected together by vertical plates 28 to which straps 30 are secured by fasteners 32, as shown in Figure 9 of the drawings.

Mounting brackets 34 are fixed to the upper frame member 12 and pivotally support hydraulic cylinders 36 having piston rods 38 that are pivotally attached to pins 40 fixed to the straps 30, so that as fluid under pressure is admitted into the cylinders 36, the rods 38 will move downwardly relatively to the cylinders 36 where tubes 26 abut the lower channels 22 and rods 24. When the fluid in the cylinders 36 is removed therefrom, the rods 38, tubes 26 and rods 24 will move downwardly and the frame 10 will be lowered toward the ground.

A transverse angle iron tool bar 42 is fixed by welding or the like to the undersurface of frame member 14 at the forward end portion of the frame 10 and its end portions support a plurality of depending shanks 44 to which ground digging elements or blades 46 are removably secured. These digging elements 46 are intended to penetrate the ground to loosen plants, stalks and the like so that the same may be lifted in a manner now to be described.

The posts 16 joining the forward corners of the frame members 12 and 14 have bearings 48 removably secured thereto, as shown in Figure 2. The upper frame member 12 is connected to a forward extension 50 of the frame 10 by connector bars 52 that removably support bearings 54. A transverse cross-bar 56 (Figure 5) is welded to the lower frame member 14 and removably supports four bearings 58 that register with the bearings 48 and 54.

Two pair of spaced parallel lifting rollers are supported on the frame 10. Each pair of lifting rollers includes an outside roller 60 and an inside roller 62. The rollers 60 and 62 are spaced parallel and extend longitudinally of the frame with their rear reduced ends 64 journaled in the bearings 58. The forward tapered ends 66 of the rollers 60 and 62 terminate in cylindrical extensions 68. The extensions 68 of rollers 60 are journaled in the bearings 48 and the extensions 68 of rollers 62 are journaled in the bearings 54, as shown in Figure 2.

The inside rollers 62 are spaced apart sufficiently to permit an endless conveyor belt 70 to extend therebetween. The belt 70 is trained over a forward idler roller 72 having a supporting shaft 74 that is journaled in bearings 76 fixed to the frame member 14 (Figure 5), and belt 70 also extends over a rear driving roller 76 having a supporting shaft 78 that is journaled in rear bearings 80 on the lower frame member 14, behind the cross-bar 56. The upper flight of belt 70 is below the upper peripheries of the horizontally disposed lifting rollers 60 and 62 and above the lower peripheries of the rollers 60 and 62, so that roots and stalks passing between the inside rollers 62 will fall onto the belt 70.

A pair of cutter supporting bars 82 are terminally welded to the upper frame member 12 as shown in Figure 1. One of the bars 82 is disposed over the inside roller 62 of one pair of lifting rollers and the other cutter supporting bar 82 is disposed over the outside roller 60 of the other pair of lifting rollers. The bars 82 are inclined relative to the longitudinal axes of the lifting rollers and removably support stationary cutter bars 84 whose inside edges overhang the bars 82.

Longitudinal angle iron reinforcing and strengthening members 86 are fixed by welding or the like to the upper face of the frame member 12 and face each other. The vertical flanges of these members, 86, support bearings 88 in which vertical shafts 90 are journaled for rotation. The lower ends of the shafts 90 are fixed within sockets 92 centrally attached to horizontally rotating cutter blades 94 that lie in a horizontal plane above the plane of the upper faces of bars 84, so that the longitudinal beveled edges of the blades 94 will coact with the inner edges of the bars 84 in cutting stalks and roots lifted by the coacting rollers 60 and 62.

A pair of longitudinal channels 96 are fixed to and extend rearwardly from the lower frame member 14. These channels, 96, are connected by a downwardly facing cross-channel 98. The web of cross-channel 98 supports, in any suitable manner, a stationary cutter bar 100 (see Figure 5). The supporting shaft 102 of a cutter or cutter reel 104 is journaled for rotation in bearings 106 mounted on the channels 96. The cutter 104 includes a pair of spaced disks 108 fixed on the shaft 102 and connected by circumferentially spaced bars 110 to which cutter bars 112 are removably secured.

Cutter 104 extends transversely of frame 10 and perpendicular to the rollers 60 and 62 behind the conveyor drive roller 76 as shown in Figure 5. A concavo-convexed guide and baffle plate 114 is fixed between the channels 96 and extends toward the cutter 104 from beneath the roller 76 to guide roots and stalks dropped from the belt 70 toward the cutter 104.

Means is provided for rotating the cutter blades 94, the rollers 60 and 62, the cutter 104 and the conveyor drive roller 76. This means is illustrated diagrammatically in Figure 8 and includes a gear box 116 that is secured to the frame extension 50. A vertical driven shaft 118 extends upwardly from the gear box 116 and supports a multi-grooved pulley 120 that is connected to multi-grooved pulleys 122 on the upper ends of the cutter blade supporting shafts 90 by endless pulley belts 124.

A horizontal shaft 126 extends through the gear box 116 and is connected through gearing (not shown) to the shaft 118. The forwardly extending end of shaft 126 is externally splined to be coupled to the power take-off shaft of a tractor and the rearwardly extending end of shaft 126 fixedly supports a pulley 128 that is connected to a pulley 130 on the forward end of a longitudinal shaft 132 by an endless pulley belt 134.

Shaft 132 is journaled in bearings 136 on the upper frame member 12 and its rear end enters a rear box 128 that is supported by the rear ends of the longitudinal members 86. Coaxial horizontal shafts 140 project from the box 138 and are connected through bearings to the rear end of shaft 132. The outer ends of shafts 140 fixedly support multi-grooved pulleys 142 that are connected to multi-grooved pulleys 144 on the ends of the cutter supporting shaft 102 by endless pulley belts 146.

An additional multi-grooved pulley 148 is fixed to an intermediate portion of shaft 132. Pulley 148 is connected to a pulley 150 on the reduced rear end of the inner roller 62 of the right pair of lifting rollers by an endless pulley belt 152, and pulley 148 is also connected to a pulley 154 on the reduced rear end of the outer roller 60 of the left pair of lifting rollers by an endless pulley belt 156. The rear ends of the rollers 60 fixedly support gears 158 that mesh with gears 160 fixed to the rear ends of the rollers 62, so that the rollers 60 will rotate opposite to the rollers 62 with the rollers 60 rotating clockwise and the rollers 62 rotating counter-clockwise when viewing the same from the front ends thereof.

One of the shafts 140 of gear box 138 rigidly supports a pulley 162 that is connected to a pulley 164 on the drive roller supporting shaft 78 by an endless pulley belt 166, so that the lower flight of belt 70 may be rotated from front to rear and toward the cutter 104.

The forward extension 50 supports a suitable hitch means 168 that is adapted to be swivelly attached to a coupling or hitch pin of a tractor, whereby the frame 10 may be pulled over the ground.

In practical use of the present invention, as the frame is pulled forwardly, the digger elements 46 will engage and loosen the roots of plants or stalks. The digger elements 46 are arranged in two groups so that two rows of stalks may be shredded at one time by this invention.

The stalks and roots, loosened by the digger elements 46, will be lifted by and between the coacting lifting rollers 60 and 62. As the stalks are lifted by the rollers 60 and 62, the blades 94 will coact with the bars 84 in cutting the stalks and roots.

During rotation of the blades 84 for cutting the stalks and roots, the blades 94 will also push or direct the cut roots and stalks onto the center conveyor belt 70 which will carry the cut roots and stalks rearwardly.

The cut roots and stalks will pass from the belt 70 onto plate 114 and then the cut roots and stalks will be engaged by cutter 104 and threshed against bar 100 to cut the roots and stalks to a finer degree. The rotating cutter 104 will also scatter the cut and shredded roots and stalks over the ground or onto a collector which may be disposed behind the frame 10.

In order to gauge the penetration of the digging elements 46, fluid is either admitted into or withdrawn from the cylinders 36. The hydraulic cylinders 36 may be operatively connected by suitable flexible tubing to the hydraulic system of a tractor.

Having described the invention, what is claimed as new is:

1. A root and stalk shredder comprising a wheeled frame, a pair of longitudinally extending side by side power driven grasping and lifting rollers rotatably supported on said frame, and a power driven blade mounted on a rotatable vertical shaft, said shaft being mounted on said frame above the rollers and the blade being operatively associated therewith for cutting roots and stalks lifted above the rollers.

2. A root and stalk shredder comprising a wheeled frame, a pair of longitudinally extending side by side power driven grasping and lifting rollers rotatably supported on said frame, a power driven blade mounted on a rotatable vertical shaft, said shaft being mounted on said frame above the rollers and the blade being operatively associated therewith for cutting roots and stalks lifted above the rollers, and longitudinal conveying means mounted on the frame adjacent the rollers for carrying rearwardly the roots and stalks cut by the blade.

3. A root and stalk shredder comprising a wheeled frame, a pair of longitudinal extending side by side power driven grasping and lifting rollers rotatably supported on said frame, and a power driven blade mounted on a rotatable vertical shaft, said shaft being mounted on said frame above the rollers and the blade operatively associated therewith for cutting roots and stalks lifted above the rollers, said wheeled frame including a duplicate pair of power driven crusher rollers rotatably mounted thereon, a duplicate blade mounted on a rotatable vertical shaft, said shaft being mounted on the frame above the duplicate rollers and the duplicate blade operatively associated therewith for cutting roots and stalks lifted above the duplicate rollers, and longitudinal conveying means mounted on said frame, said conveying means being disposed adjacent to and between the pair of rollers and the duplicate pair of rollers for carrying rearwardly the roots and stalks cut by the blade and the duplicate blade.

References Cited in the file of this patent

UNITED STATES PATENTS

| Number | Name | Date |
|---|---|---|
| 1,713,197 | Spell | May 14, 1929 |
| 2,544,023 | Johnson | Mar. 6, 1951 |
| 2,544,024 | Johnson | Mar. 6, 1951 |
| 2,544,025 | Johnson | Mar. 6, 1951 |
| 2,629,978 | Krause et al. | Mar. 3, 1953 |